US006242028B1

(12) United States Patent
Bean

(10) Patent No.: US 6,242,028 B1
(45) Date of Patent: Jun. 5, 2001

(54) PROCESS OF, AND APPARATUS FOR, MOULDING CONFECTIONERY

(76) Inventor: Michael J. Bean, 12 Apsley Way, Peterborough, PE3 9NE (GB)

( * ) Notice: Subject to any disclaimer, the term of this patent is extended or adjusted under 35 U.S.C. 154(b) by 0 days.

(21) Appl. No.: 09/319,299

(22) PCT Filed: Dec. 3, 1997

(86) PCT No.: PCT/GB97/03328

§ 371 Date: Aug. 9, 1999

§ 102(e) Date: Aug. 9, 1999

(87) PCT Pub. No.: WO98/24325

PCT Pub. Date: Jun. 11, 1998

(30) Foreign Application Priority Data

Dec. 5, 1996 (GB) .................................... 9625318
Mar. 24, 1997 (GB) .................................... 9706097

(51) Int. Cl.[7] ................ A23G 7/00; A23P 1/00
(52) U.S. Cl. ................ 426/515; 62/63; 62/345; 425/259; 426/524; 426/660
(58) Field of Search .................. 426/524, 515, 426/660; 62/63, 345, 356, 374, 380; 425/259, 451

(56) References Cited

U.S. PATENT DOCUMENTS

| 4,200,658 | * | 4/1980 | Katzman et al. ............ 426/524 |
| 4,530,214 | | 7/1985 | Ellsworth ................. 62/71 |
| 4,548,045 | | 10/1985 | Altares et al. ............ 62/63 |
| 4,548,573 | * | 10/1985 | Waldstrom ................ 62/345 |
| 4,704,873 | | 11/1987 | Imaike et al. ............. 62/64 |
| 4,882,176 | * | 11/1989 | Koyama et al. ............ 426/524 |
| 5,279,842 | * | 1/1994 | Gallart et al. ............ 426/660 |
| 5,394,707 | * | 3/1995 | Miller et al. ............. 62/345 |

FOREIGN PATENT DOCUMENTS

| 0422883 | * | 4/1991 | (EP) . |
| 582327 | | 2/1994 | (EP) . |
| 2530421 | | 1/1984 | (FR) . |
| 2604063 | * | 3/1988 | (FR) . |
| 2078155 | | 1/1982 | (GB) . |
| WO 94/07375 | | 4/1994 | (WO) . |
| WO 95/32633 | * | 12/1995 | (WO) . |

* cited by examiner

*Primary Examiner*—George C. Yeung
(74) *Attorney, Agent, or Firm*—Foley, Hoag & Eliot; W. Hugo Liepmann; Kevin A. Oliver

(57) ABSTRACT

A process and apparatus for producing a moulded soft confectionery item. The soft confectionary item is relatively soft at room temperature and therefore difficult to handle mechanically at room temperature. The confectionery item can be selected from the group consisting of at least one of caramels, fudges, fondant creams, toffees, and jellies, the confectionery item further based on at least one of starch, gelatine, pectin, agar-agar, gum Arabic, and soft fondant creams. The process and apparatus includes a method and apparatus for depositing a liquid form of the confectionery item into a mold, by the use of gravity, subjecting the mold, together with the liquid confectionery item deposited, to a low temperature environment between 0° C. and −196° C. so as to solidify at least the exterior of the deposited confectionery material, and demolding the resulting solidified item of confectionery. The low temperature environment can be facilitated by a cryogenic material that can be in liquid or spray form.

28 Claims, 6 Drawing Sheets

PROCESS OF, AND APPARATUS FOR, MOULDING CONFECTIONERY

BACKGROUND OF THE INVENTION

This invention relates to a process of, and apparatus for moulding confectionery, particularly but not exclusively to soft confectionery items, that is, confectionery items which are relatively soft at room temperature and therefore difficult to handle mechanically at room temperature. Such items include fondant creams, toffees, gums and jellies based on starch, gelatine, pectin, agar-agar or gum arabic or soft fondant creams, and caramels/fudges, and which can be in the form of an individual sweet/sweet centre or in the form of a larger bar or confectionery on a stick.

Such soft confectionery items were traditionally moulded in starch moulds on moguls and then the starch was removed and recycled to produce further moulds.

There are various problems associated with the starch mogul process. For example, the possibility of an explosion of starch released into the atmosphere, but the process does have the advantage that frequent changes in product type and shape can be accommodated.

In order to avoid the disadvantages of the starch mogul process, we developed a successful process in which air is used in the demoulding of such soft confectionery items, the air being admitted to the individual mould cavities through a series of fine holes provided in the base of the mould cavity. Patent Specification No. GB 1050699 describes such a process. It is, however, relatively expensive to drill a series of fine holes in a large number of moulds, and one attempt to overcome that difficulty is disclosed in Patent Specification No. GB 2078155A.

The present invention is based upon our realisation that it might be possible to solidify at least the exterior of a soft confectionery item, so as to enable the item to be subjected to a mechanical force to demould the item, yet without the item suffering any significant damage during demoulding.

We are aware that it is known, for example from specification EP 0582327A2, in the preparation of frozen confectionery (that is confectionery that is normally consumed whilst in a frozen state, such as ice lollies) to fill a mould with an aqueous liquid mixture and, in order to freeze the liquid, to subject the mould to a low temperature environment of below 50° C.

Our invention, on the other hand, is concerned with a process which is carried out on a soft confectionery material, that is a confectionery material which at room temperatures is soft as compared with a frozen confectionery material which is, of course, in a liquid state when said confectionery material is at room temperature.

SUMMARY OF THE PRESENT INVENTION

According to one aspect of the present invention, we provide a process for producing a moulded soft confectionery item, that is, a confectionery item which is relatively soft at room temperature and therefore difficult to handle mechanically at room temperature, said items being of the group comprising fondant creams, toffees, gums and jellies based on starch, gelatine, pectin, agar-agar or gum Arabic or soft fondant creams, and caramels/fudges, comprising the steps of depositing liquid confectionery material into a mould, by the use of gravity, subjecting the mould, together with the confectionery material deposited, to a low temperature environment of between 0° C. and −196° C. so as to solidify at least the exterior of the deposited confectionery material, and then demoulding the resulting solidified item of confectionery.

Demoulding may take place at a temperature of between −40° C. and −50° C.

The low temperature environment preferably exists within an enclosure and demoulding takes place within the enclosure, or after exit from the enclosure.

The low temperature environment may be provided by bringing at least the mould into contact with cryogenic material.

For some confectionery materials a pre-form or deposit of the material may be pressed into the mould to shape the material.

Depending upon the type of the material to be moulded, the material in the mould may need to be cooled and/or allowed to set for a period of time prior to the mould being subjected to the low temperature environment. It may be desirable that the mould is placed in an inverted condition to facilitate subsequent demoulding.

The deposited confectionery material may be ejected from its mould by mechanical ejection means associated with the base of the mould. This could be an ejection member operating through an aperture in the base of the mould, but preferably the mould is resilient, so that the base of the mould is deflectable relative to the side walls of the mould, the base of the mould preferably being resiliently deflectable also, whereby the mould may be distorted in order to achieve demoulding by 'popping' and/or shaking and the use of gravity.

It will be appreciated that the material of the mould must be capable of withstanding freezing temperatures yet retain some resilience if ejection is to be effected by deflection of the mould base. Suitable materials are plastics materials such as PET (polytetratrifluoro-ethylene), the mould material being chosen according to the freezing temperatures employed.

It may be desirable to employ a release agent on the inner surface of the mould, such as an anhydrous wax-containing release agent, eg TRENWAX™ML of Boehringer, which has been found to provide good release for PET moulds.

The moulds may be used in a batch process or in a continuous process in which the moulds are carried by a conveyor, or a chain system, other carrying means, or are incorporated into the conveyor band. The conveyor band could also comprise moulds hinged together by integral webs.

In some circumstances it would be possible to form the moulds themselves, for example at a thermo-forming station, upstream of a depositing station at which the mould cavities are supplied with the confectionery.

The moulds containing shaped material may be subjected to a mist of cryogenic material in a gaseous state, such as liquid nitrogen.

The low temperature environment may be provided in an enclosure, such as a tunnel provided with curtain means at the inlet and outlet thereof.

In some cases product or mould re-heating or humidity control may be required after ejection to avoid any surface condensation if this adversely affects product quality or ejection efficiency.

The invention also comprises a moulded confectionery item produced by the inventive process.

The invention further comprises the accelerated manufacture of an item of confectionery containing gelatine wherein the item is subjected to a freezing process.

According to a second aspect of the present invention apparatus adapted to perform the process of the first aspect of the invention comprises a liquid confectionery depositor adapted to deposit, in a liquid state, soft confectionery material of the said group, a conveyor suitable for transporting open-topped moulds beneath the depositor so as to receive liquid confectionery dispensed thereby, characterised by an enclosure for receiving the moulds and their contents as they are transported, means for producing a low temperature environment of at least −60° C. within the enclosure whereby, in use, both the moulds and their contents are subjected to said low temperature environment, and a demoulder adapted, in use, to demould the items of confectionery present in the moulds.

DESCRIPTION OF THE DRAWINGS

Processes and apparatus in accordance with the various aspects of the invention will now be described, by way of example only, with reference to the accompanying schematic drawings, wherein:

FIG. 1 is a longitudinal cross-section of a depositing, freezing and demoulding line suitable for producing soft gums, jellies and the like;

DETAILED DESCRIPTION OF THE PREFERRED EMBODIMENTS

Figure 1:
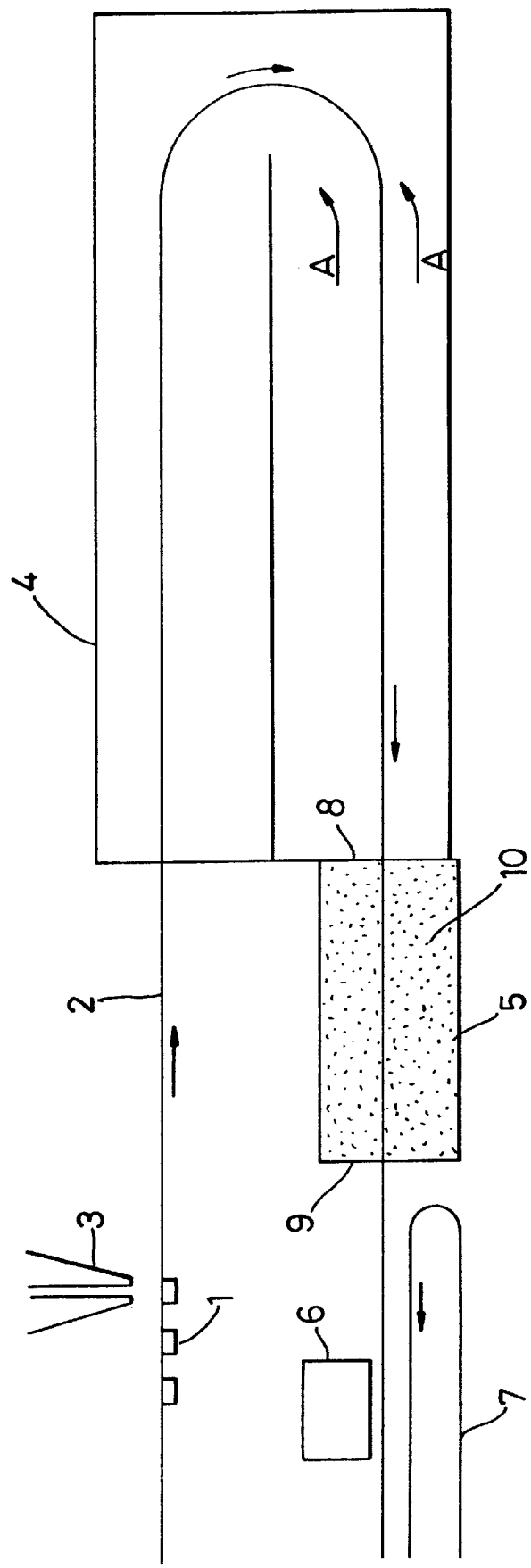

With reference to FIG. 1, a series of open-topped moulds 1 of resilient plastics material, in this example polyethylene terephthalate (PET), are conveyed by a main conveyor 2 beneath a liquid confectionery depositor 3, through a cooling tunnel 4, through a freezer tunnel 5, and then beneath a demoulding means 6. The depositor 3, which makes use of gravity when depositing, and the cooling tunnel 4 are of conventional construction. Air, which may be refrigerated air, is blown through the cooling tunnel in a direction indicated at A, which is opposite to the direction of conveyor travel.

The resilient moulds 1 have a protruding base of a thickness such that they can be popped by the demoulding means 6 which can be a conventional demoulding means as used with rubber moulds, In use the demoulding means 6 exert a downward mechanical ejection force on the central region of a mould as the inverted mould passes beneath the demoulding means 6. The demoulded confectionery items drop onto the delivery conveyor 7 which is synchronised with the main conveyor 2 in known manner.

The tunnel 5 provides a low temperature environment. It comprises an enclosure through which the conveyor 2 runs and is provided with inlet and outlet curtains 8, 9 to contain a mist of liquid cryogenic material 10 (liquid nitrogen) which is generated within the freezer 5 by sprayers discharging the cryogenic material into the freezer. See also FIG. 6.

The freezer 5 provides a low temperature environment of between 0° C. and −196° C.

The freezer 5 rapidly cools the liquid confectionery material contained in the (inverted) moulds 1 as the moulds pass through the freezer. The temperature of the deposited confectionery item can be reduced to temperatures as low as −196° C., if required to render the confectionery item wholly solid.

However, it may be desirable merely to solidify only the exterior of the deposited confectionery material, so as to enable the item to subsequently be subjected to a mechanical demoulding force, without suffering significant damage.

Demoulding may take place with the low temperature environment provided by the tunnel 5. The demoulding means 6 will then be disposed within the tunnel 5.

It has been found that, with jellies containing gelatine, the freezing agent also reduced the liquid to jelly setting time, thus dispensing with the need for the cooling tunnel 4.

Figure 6:
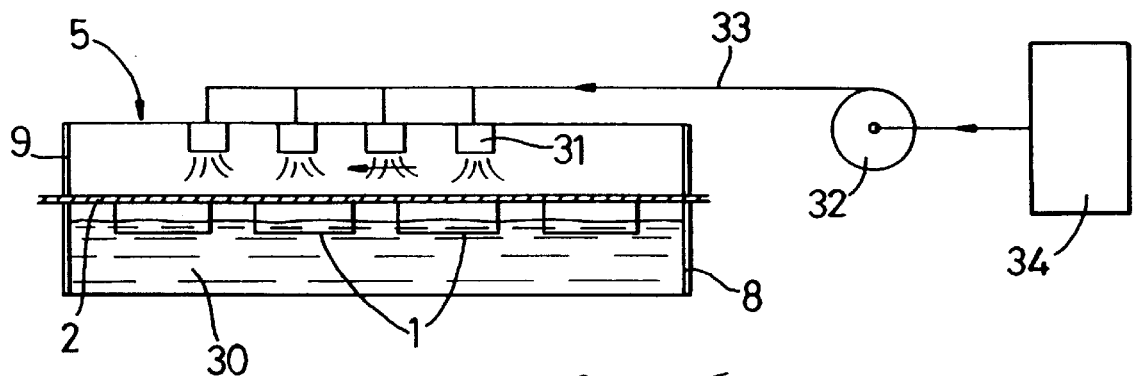
FIG. 6 illustrates a modification.

In a modification illustrated by FIG. 6, the freezer 5 contains a bath 30 of liquid nitrogen, and the moulds with their contents are conveyed through the bath.

FIG. 6 shows only the bases of the moulds 1 immersed in the bath 30. The whole of each mould 1, plus its contents, may be immersed if required, although this may result in over-freezing of the deposited confectionery.

FIG. 6 also shows the use, by the freezer 5, of atomising sprayers 31, supplied with liquid nitrogen by pump 32, through a line 33. The suction side of the pump 32 is connected to a source 34 of liquid nitrogen. The sprayers 31 produce a mist of liquid nitrogen.

In FIG. 6, the moulds 1 and their confectionery contents are shown being subjected to a combination of a bath and spray of liquid nitrogen, whereas in practice, the filled moulds 1 may be subject to only the sprayers, or the bath.

Although liquid nitrogen, being inert, is the preferred cryogenic material, liquid oxygen or liquid air are alternative cryogenic materials.

The cooling tunnel 4 and freezer enclosure 5 provide the mould and its deposited confectionery with a two-stage low temperature environment, wherein the environment of the second state (freezer enclosure 5) is at a lower temperature than that of the first stage (cooling tunnel 4).

However, in a preferred arrangement the cooling tunnel 4 is dispensed with, and only the freezer 5 is employed, whereby the moulds 1 with the liquid confectionery deposited therein pass immediately to the freezer 5 after deposition takes place.

Figure 2:
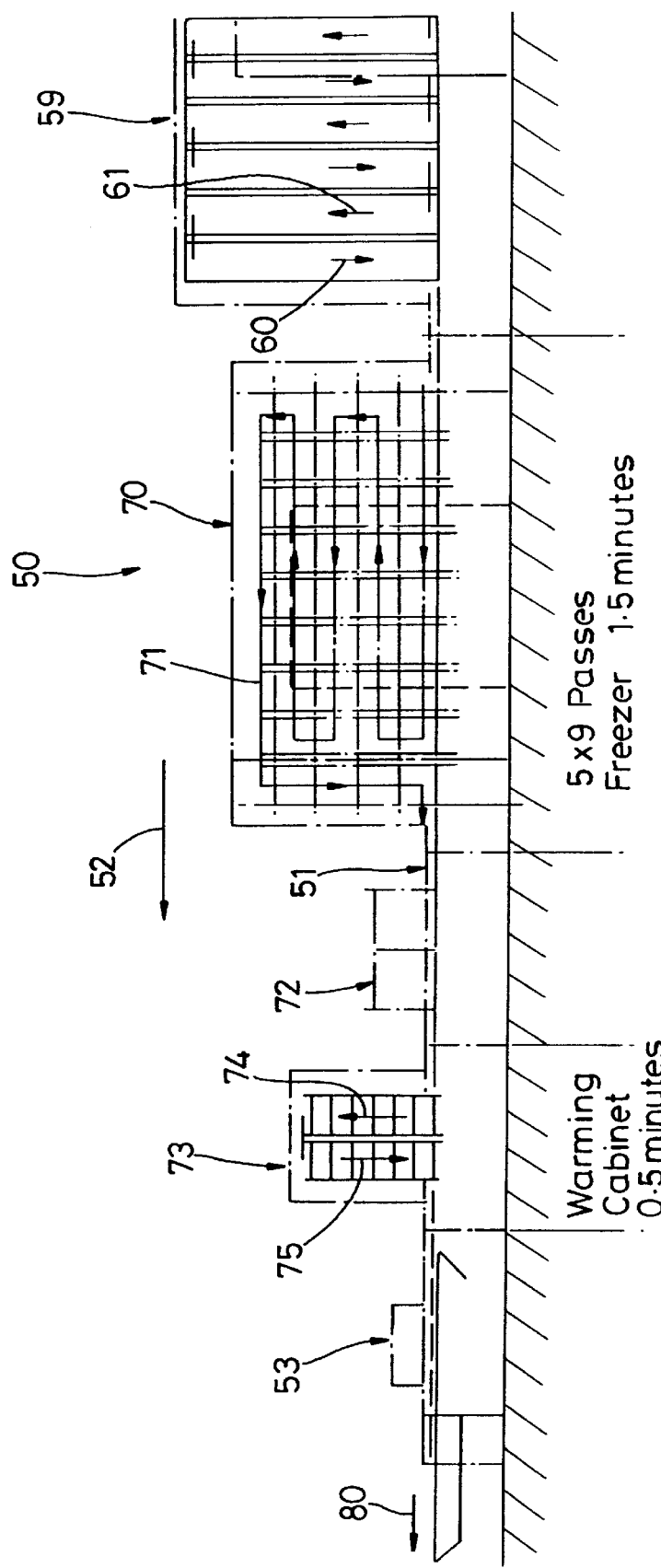
FIGS. 2 and 3 together illustrate a similar view, but of a modified line.
Figure 3:
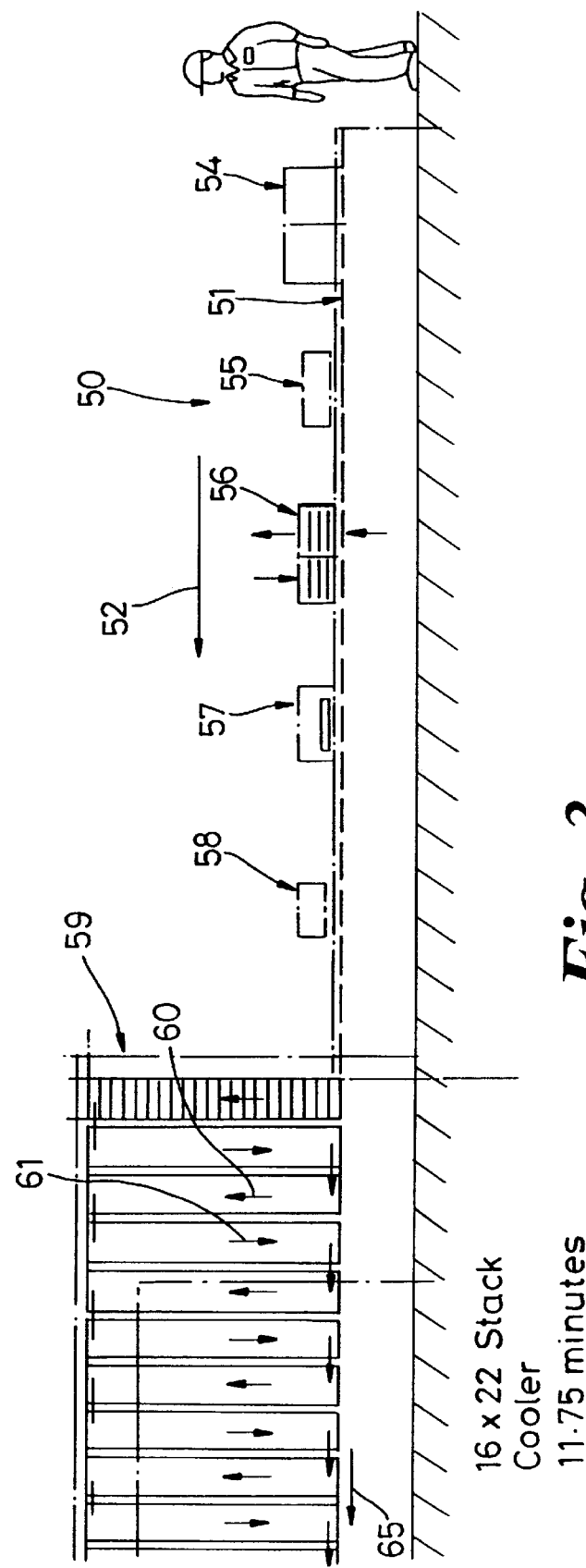
Figure 4:
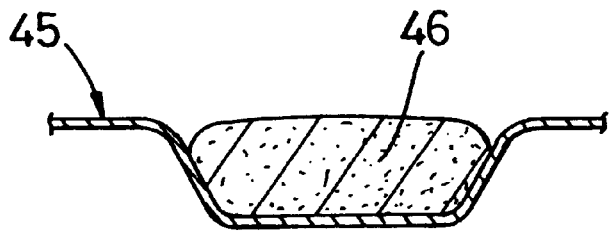
FIG. 4 is a fragmentary view, in cross-section, of a mould cavity and moulded item therein.

With reference to the modified line 50 of FIGS. 2, 3 and 4, a series of open-topped confectionery moulds 45 of PET or other plastics material of resilient form, are conveyed by independent chain circuits 51 in a direction indicated by arrows 52 towards a product ejector 53 (FIG. 2) at the end of the line, where the frozen confectionery items are 'popped' out of their moulds.

The moulds 45 are conveyed past a mould turn-over unit 54 where they are placed in open-topped positions, then past a sticker detection unit 55.

The detection unit 55 makes use of sensors such as mechanical probes or energy (eg infra-red) beam emitters to detect the presence of any previously moulded item stuck or otherwise retained in a mould cavity. If such an item is detected, the unit 55 operates to send a rejection signal to an unload/load unit 56 which is next in line. On receipt of the rejection signal, the unit 56 operates to push the detected mould out of line into a mould reject stack, and replace it with a 'clean' or fresh mould from a loader stack.

The interiors of the moulds which pass inspection by the unit 55 may then be sprayed with a release agent by spray unit 57 before passing beneath a depositing head 58 where confectionery material (in this example jelly syrup) is discharged into the mould interiors. A suitable release agent is TRENWAX™ML referred to above.

Next, the now-filled moulds 45 enter a multi-stage cooler 59 where they are transported in upward and downward direction, as indicated by arrows 60, 61 during passage through the cooler. Refrigerated air is blown through the cooler 59 to cool the confectionery item 46 contained in the moulds 45. Passage through the cooler 59, where the moulds and the items 46 they contain are cooled to about 24° C., takes about 12 minutes. If desired, however, the cooler 59 can be by-passed, as indicated by the arrow 65.

From the cooler 59, the moulds 45 and items 46 pass through a freezer enclosure 70, which may be of the form described above with reference to FIG. 9. Here they follow a sinuous path as indicated by the zig-zagging arrow 71.

In the freezer enclosure 70, the moulds 45 and the items 46 they contain are reduced in temperature say, to between −40° C. and −70° C., by application thereto of cryogenic material, in this example liquid nitrogen, which may be of mist form.

The moulds 45, with their contents, leave the freezer enclosure 70 to rejoin the conveyor 51 and then pass through a mould turn-over unit 72, where the moulds 45 are up-turned so as to face downwards, and then through a warming cabinet 73. Passage through the warming cabinet 73 follows first an upward path, and then a downward path, indicated by arrows 74, 75. The time taken to pass through the warming cabinet 73 is about 0.5 minutes.

During passage through the warming cabinet 73, warm air (at say between 21° C. to 55° C.) is discharged on to the backs of the moulds 45. This warming action facilitates subsequent mould deformation, (to release the moulded items of confectionery), in the ejector 53. Warming of the moulds also enables the use of less expensive mould material which would otherwise need to remain resilient at a lower temperature. It also melts any release agent oil present between the moulds and the frozen confectionery items so as to assist ejection of the latter. Furthermore, it tends to expand the moulds, which also assists frozen item ejection.

Warming of the moulds 45 may make it possible, in some situations, to avoid the need for mould deformation.

Figure 5:
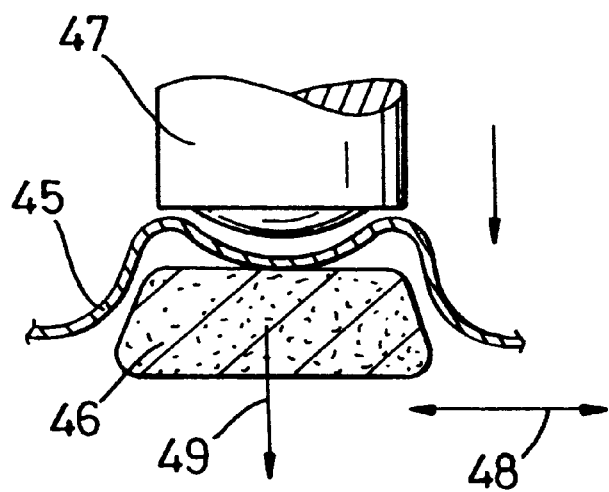
FIG. 5 is a similar illustration which demonstrates demoulding of the item.

The ejector 53, which alternatively may be disposed within the low temperature environment provided by the enclosure 70, makes use of a plurality of ejector plungers or buttons 47 (FIG. 5) whereby the frozen items 46 of confectionery are demoulded or ejected by 'popping' them out of their resilient moulds 45, the moulds 45 being distorted to assist ejection. The confectionery items 46 then pass to a packing station, as indicated by the arrow 80, while the now empty moulds return, in an inverted condition, to the mould turn-over unit 54 for subsequent re-use.

Ejection of the items 46 may be assisted by a slight vibrational force, represented by arrow 48, whereby the moulds 45 and items 46 are subjected to shaking. Gravity and/or vacuum, represented by arrow 49, also assists in the ejection.

The cooler 59 may be dispensed with, whereby a low temperature environment is provided by the freezer enclosure 70.

Before packing, the items 46 may be subjected to sugar coating or 'sanding', or to glazing. A mould release agent can be used as a glaze for jelly product.

Humidity control may be used during any of the cooling, freezing or warming stages to prevent stickiness and to dry the items.

Figure 7:
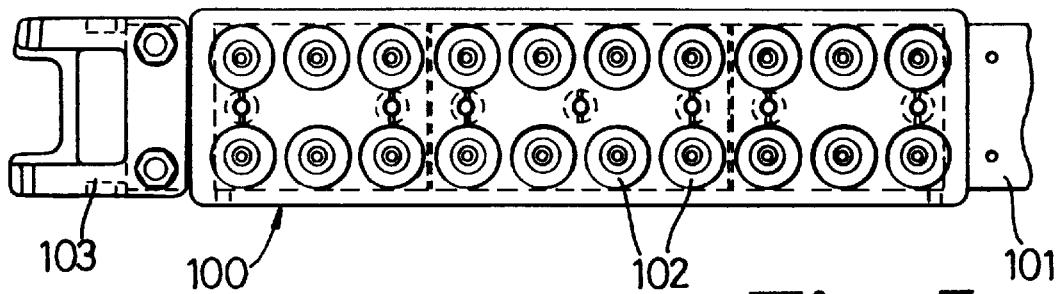
FIG. 7 is a plan view of a multi-cavity mould.
Figure 8:
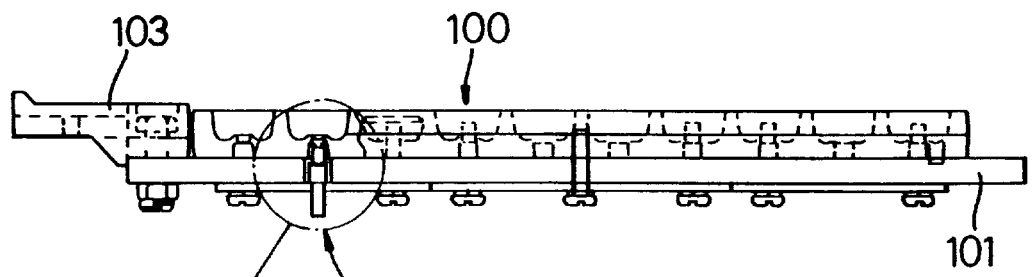
FIG. 8 is a side view thereof, partly in section.

FIGS. 7 and 8 illustrate a multi-cavity mould 100, comprising one of a series or train of interconnected mould.

The mould 100 is a 'thick' mould, made of aluminium. The ratio of heat capacity of the mould 100 and the confectionery material deposited therein is not less than 2:

The mould 100, which is demountably mounted on a carrier plate 101, defines a plurality of mould cavities 102, disposed in two parallel, longitudinally-extending rows. Similar moulds are end-connected to each other by couplings 103.

Figure 9:
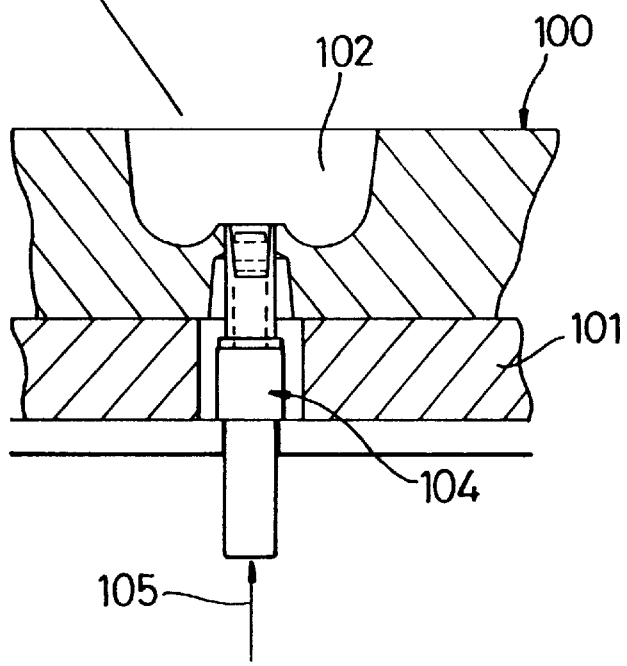
FIG. 9 is an enlarged view of the sectioned area enclosed by the circle IX of FIG. 8.

As best illustrated by FIG. 9, confectionery items are demoulded from a mould cavity 102 by a mechanically actuated ejector plunger or pin 104, whereby the upper end of the pin is made to enter the bottom of the cavity. The mould ejection force, which is applied to the bottom of the pin 104, is represented by arrow 105.

Figure 10:
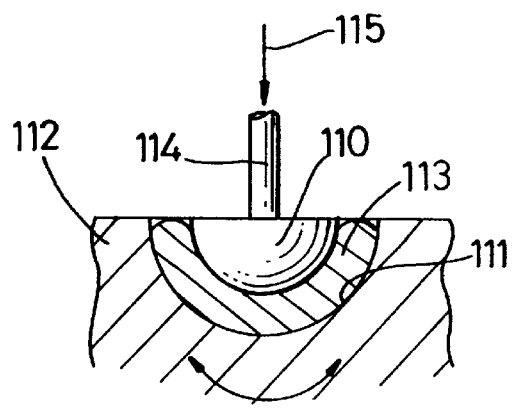
FIG. 10 illustrates a shell-forming damper.

FIG. 10 illustrates use of a displacement damper 110, so as to displace a metered quantity of liquid confectionery material deposited in a cavity 111 of a mould 112 upwardly, over the damper 110, so as to form an item 113 of half shell-like form. The mechanical force applied to the actuating stem 114 of the damper 110 is represented by arrow 115.

Figure 11:
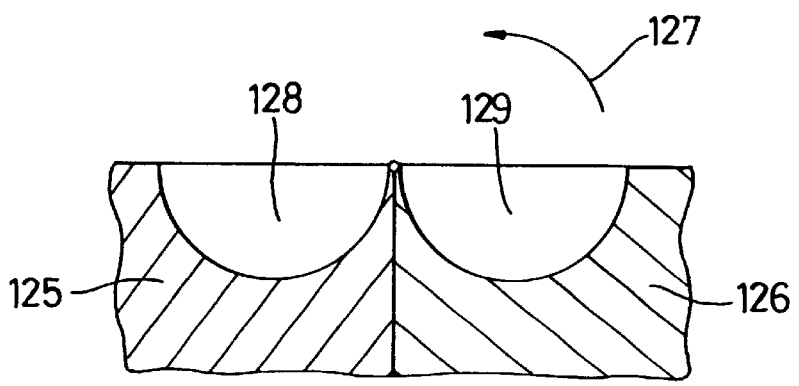
FIG. 11 illustrates a modified mould.

FIG. 11 illustrated a two-part mould, comprising hinged parts 125, 126 which can be brought together, as illustrated by arrow 127, so as to form a single item of confectionery material, (which may then comprise half shells), in the juxtaposed mould cavities 128, 129. Uniting of the two deposits of confectionery material to form a single item preferably takes place immediately before the mould parts 125, 126 and their contents enter the low temperature environment freezer.

It will be appreciated that the moulds, particularly 'thick', relatively large mass moulds of metal, such as mould 100 of FIGS. 7 to 9, serve as cold 'sinks' which retain a substantial amount of low temperature 'heat' after demoulding. This leads to production efficiency when the moulds are represented for re-filling with liquid confectionery.

Where desirable, and where practicable, any of the features disclosed herein may be substituted by, or added to, other such features.

What is claimed is:

1. A process for producing a moulded soft confectionery item, that is, a confectionery item which is relatively soft at room temperature and therefore difficult to handle mechanically at room temperature, said confectionery item comprising at least one of a caramel, fudge, fondant cream, toffee, and jelly, the confectionery item based on at least one of a starch, gelatine, pectin, agar-agar, gum Arabic, and soft fondant cream, the process comprising depositing the confectionery item in liquid form into a mould, by the use of gravity, subjecting the mould, together with the liquid confectionery item deposited, to a low temperature environment between 0° C. and −196° C. so as to solidify at least the exterior of the deposited confectionery material, and demoulding the resulting solidified item of confectionery.

2. A process according to claim 1, wherein demoulding takes place at a temperature between −40° C. and −50° C.

3. A process according to claim 1, wherein subjecting the mould to a low temperature environment comprises, subjecting the mould to an enclosure, and wherein demoulding comprises at least one of demoulding within the enclosure and demoulding after exit from the enclosure.

4. A process according to claim 1, wherein subjecting the mould further comprises providing the low temperature environment by bringing at least the mould into contact with a cryogenic material.

5. A process according to claim 1, wherein subjecting the mould further comprises bringing a cryogenic material into contact with the confectionery item deposited in the mould.

6. A process according to claim 4, wherein providing the low temperature environment further comprises providing the cryogenic material in spray form.

7. A process according to claim 1, wherein subjecting the mould further comprises bringing the base of the mould into contact with a liquid bath of a cryogenic material.

8. A process according to claim 7, wherein bringing the base of the mould into contact with a cryogenic material further comprises bringing the base of the mould into contact with a combination of a bath and spray of cryogenic material.

9. A process according to claim 4, wherein providing the low temperature environment further comprises providing the cryogenic material as liquid nitrogen.

10. A process according to claim 4, wherein providing the low temperature environment further comprises providing the cryogenic material as liquid oxygen.

11. A process according to claim 4, wherein providing the low temperature environment further comprises providing the cryogenic material as liquid air.

12. A process according to claim 1, wherein demoulding comprises using a mechanical ejection force.

13. A process according to claim 1, wherein demoulding comprises using a vacuum force.

14. A process according to claim 1, wherein demoulding comprises using gravity.

15. A process according to claim 1, wherein demoulding comprises using a vibrational force.

16. A process according to claim 1, further comprising providing the mould of resilient material to allow distortion during demoulding.

17. A process according to claim 1, further comprising subjecting the deposited confectionery to a tamping force before being subjected to the low temperature environment.

18. A process according to claim 1, further comprising providing a mould as one of a plurality of mould cavities defined by a single body.

19. A process according to claim 1, further comprising providing a mould that is open-topped.

20. A process according to claim 1, further comprising providing a mould having two-part form, each part defining a moulding cavity, whereby the two parts are brought together after moulding, so as to form a single item of confectionery.

21. A process according to claim 1, wherein subjecting the mould to a low temperature environment further comprises subjecting the mould and deposited confectionery to a two-stage low temperature environment having a first stage and a second state, wherein the second stage is at a lower temperature than the first stage.

22. A process according to claim 1, wherein subjecting the mould to a low temperature environment further comprises subjecting the mould to a freezing process that makes use of cryogenic material.

23. A process according to claim 1, further comprising providing a warming stage for the mould after subjecting the mould to the low temperature environment.

24. A process according to claim 23, wherein providing a warming stage comprises discharging warm air on the backs of the moulds.

25. A process according to claim 23, wherein providing a warming stage comprises discharging warm air at a temperature range of 21° C. to 55° C.

26. A process according to claim 1, further comprising providing a humidity control.

27. A moulded confectionary item produced by the process claimed in claim 1.

28. An apparatus for producing a moulded soft confectionery item, comprising a liquid confectionery depositor for depositing, in a liquid state, soft confectionery item selected from the group consisting of at least one of caramels, fudges, fondant creams, toffees, and jellies, the confectionery item based on at least one of starch, gelatine, pectin, agar-agar, gum Arabic, and soft fondant creams, a heater for transforming the selected soft confectionery items into a liquid state, a conveyor for transporting open-topped moulds beneath the depositor so as to receive liquid confectionery items dispensed thereby, an enclosure for receiving the moulds and their contents as they are transported, means for producing a low temperature environment of at least −60° C. within the enclosure whereby, in use, both the moulds and their contents are subjected to said low temperature environment, and a demoulder adapted, in use, to demould the confectionery items present in the moulds.

* * * * *

UNITED STATES PATENT AND TRADEMARK OFFICE
CERTIFICATE OF CORRECTION

PATENT NO. : 6,242,028 B1
DATED : June 5, 2001
INVENTOR(S) : Michael J. Bean

Page 1 of 1

It is certified that error appears in the above-identified patent and that said Letters Patent is hereby corrected as shown below:

<u>Title page,</u>
Assignee:
APV UK Limited
Gatwick Road
P.O. Box 4
Crawley, Great Britain Rh10-2QB Signed and Sealed this Sixth Day of November, 2001

Attest:

*Nicholas P. Godici*

NICHOLAS P. GODICI
*Attesting Officer*   *Acting Director of the United States Patent and Trademark Office*